United States Patent Office 3,644,374

Patented Feb. 22, 1972

3,644,374

PROCESS FOR THE PREPARATION OF ACYLATED AMIDES

Raoul Buijle, 44 Dreve Pittoreque, Brussels 18, Belgium, and Heinz G. Viehe, 36 Avenue Schaveys, Beersel, Linkebeek, Belgium

No Drawing. Continuation-in-part of abandoned application Ser. No. 593,651, Nov. 14, 1966. This application Apr. 4, 1969, Ser. No. 813,755

Int. Cl. C07d *29/24*

U.S. Cl. 260—293.88 1 Claim

ABSTRACT OF THE DISCLOSURE

A process for the preparation of acylated amides is disclosed wherein an amide, such as N,N-dimethyl propionamide, is contacted with phosgene in a mole ratio of phosgene to amide of at least about 1.5 to 1. The acylated amide is useful in the preparation of various heterocyclic compositions by ring closure of the amide with compounds having two active hydrogens, such as hydroxyl amines.

This application is a continuation-in-part of Ser. No. 593,651, by R. Buijle et al., filed Nov. 14, 1966, now abandoned.

This invention relates to a novel process for the preparation of heterocyclic compositions. In one aspect, this invention relates to a novel process for the acylation of amides. In a further aspect, this invention relates to certain novel heterocyclic compositions which are prepared by the aforementioned novel process.

Heretofore, a wide variety of reactions involving amides have been reported in the literature. For example, it is well known that amides hydrolyze to acids, they can be converted into nitriles by a process of dehydration, or they react with reagents in the same manner as acid chlorides. It has also been reported that amides undergo reaction with phosgene to give chlorinated amines, often in salt form, in relatively high yields. However, prior to the instant invention there has been no reference in the literature to olefinically unsaturated amines containing chloro and chlorocarbonyl groups respectively on the carbon atoms alpha, beta to the amine nitrogen and which contain the double bond between the alpha and beta carbon atoms. Such compositions would be of importance as intermediates in the synthesis of a wide variety of heterocyclic compounds containing an amino group attaching directly to a ring carbon atom.

It is therefore an object of the present invention to provide a novel process for the preparation of heterocyclic compositions. Another object of this invention is to provide a novel process for the acylation of amides. A further object is to provide a novel process for the preparation of aminopyrazolones. Another object of this invention is to provide a process for the preparation of aminoisoxazolones. A further object is to provide a novel process for the preparation of aminopyrimidinones. A still further object of this invention is to provide certain novel heterocyclic compositions. These and other objects will readily become apparent to those skilled in the art in the light of the teachings herein set forth.

In one aspect, this invention relates to a novel process for the preparation of heterocyclic compositions which comprises (a) acylation of an amide and (b) ring closure of the resulting acylated product. As hereinbefore indicated, the invention also relates to certain novel heterocyclic compounds.

The first step of the novel process which comprises the acylation of an amide can be illustrated by the following reaction:

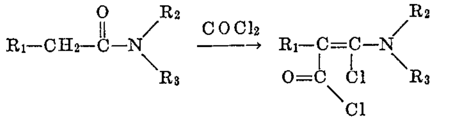

(I)

wherein $R_1$ represents halogen, or aliphatic, cycloaliphatic, aromatic or heterocyclic groups and $R_2$ and $R_3$ represent aliphatic, cycloaliphatic, aromatic or heterocyclic groups, or both $R_2$ and $R_3$ when taken together can form a 5 or 6 membered cyclic ring with the nitrogen atoms to which they are attached, e.g., a 1-piperidyl group. Additionally, $R_1$ and either $R_2$ or $R_3$ when taken together can form a 5–7 membered cyclic ring, e.g., an N-substituted pyrrolidone or an N-substituted caprolactam. The $R_1$–$R_3$ groups preferably each contain up to 18 carbon atoms.

Preferred amides which can be employed in the process of this invention include those wherein $R_1$ represents halogen, i.e., chloro, bromo and the like, alkyl alkenyl, hydroxyalkyl, cycloalkyl, cycloalkenyl, cycloalkylalkyl, cycloalkenylalkyl, aryl, aralkyl, alkaryl, haloaryl, haloarylalkyl, pyridyl, nitrofuryl, and the like; and $R_2$ and $R_3$ represent alkyl, alkenyl, cycloalkyl, cycloalkenyl, aryl, aralkyl, alkarylamino, aminoalkyl, alkylaminoalkyl, dialkylaminoalkyl, or both $R_2$ and $R_3$ when taken with the nitrogen atom to which they are attached can represent pyridyl, piperidyl, pyrrolidyl, and the like, or $R_1$ and either $R_2$ or $R_3$ when taken together can form a 5–7 membered cyclic ring, such as, N-substituted pyrrolidones or N-substituted caprolactams.

Particularly preferred compositions are those wherein $R_1$–$R_3$ are composed of carbon, hydrogen, and in some instances nitrogen and/or oxygen and each contain a total of up to 18 atoms.

Illustrative amides which can be employed in the process of this invention include, among others, N,N-dimethyl-propionamide,
N,N-diethyl-butylamide,
N,N-dimethyl-2-methyl-propionamide,
N-methyl-N-ethyl-valeramide,
N,N-dipropyl-caproamide,
N,N-dibutylcaprylamide,
N-ethyl-N-pentyl-butylamide,
N,N-dimethyl-3-chloropropionamide,
N,N-diethyl-3-phenylproprionamide,
N,N-diphenylproprionamide,
N-methyl-N-phenyl-butylamide,
N,N-di(para-chlorophenyl)-valeramide,
N-methyl-pyrrolidone,
N-phenyl-caprolactame,
N-propylcarbonylpiperidine, and the like.

As previously indicated, the process of this invention is effected by acylating the amide with phosgene and thereafter recovering the acylated product of Formula I. The temperature at which the reaction is conducted is not necessarily critical and it can be effected at temperatures within the range of from about 0° to about 50° C., and more preferably from about 20° C. to about 50° C.

If desired, the reaction between the amide and phosgene can be conducted in the presence of a solvent which is inert to the reactants and which is easily separated from the product. Typical inert, liquid solvents which have been found suitable for utilization as media in the process of the present invention include, among others, aromatic hydrocarbons such as toluene, xylene, naphthalene, tetrahydronaphthalene, benzene, biphenyl, cymeno, amylbenzene, cycloaliphatic hydrocarbons such as cyclohexane, heptylcyclopentane, decahydronaphthalene, the chlorinated aromatic hydrocarbons such as chlorobenzene, orthodichlorobenzene, 1,2,4-trichlorobenzene, the chlorinated aliphatic hydrocarbons such as carbon tetrachloride, tetrachloroethylene, trichloroethylene, the dialkyl ketones such as diisobutyl ketone, methylisobutyl ketone, methylhexyl ketone, diisopropyl ketone and other solvents such as tetramethylene sulfone and the like.

It has been observed that the ratio of phosgene to amide is critical in order to obtain the optimum yield of the acylated product. In practice, the ratio of phosgene to amide must be at least about 1.5 to 1 or higher.

In a preferred embodiment of the process for preparing the acylated intermediate, 1 mole of amide is added to 2.5 moles of phosgene contained in toluene at room temperature. After the reaction is completed, the mixture is filtered and the solvent evaporated to obtain the desired acylated product.

Recovery of the acylated product is easily accomplished by filtration of the reaction mixture to remove solid byproducts followed by distillation or evaporation of the solvent from the filtrate.

The second step of the process of this invention involves ring closure of the intermediate acylated product. Depending upon the particular active hydrogen reactant employed with the intermediate, a wide variety of heterocyclic compounds can be obtained. For instance, the acylated intermediate reacts with substituted and unsubstituted hydrazines, substituted and unsubstituted hydroxylamines, and the like, to give five-membered heterocyclic rings. Moreover, it reacts with amidines and monosubstituted amidines to give six-membered heterocycles or with ortho-phenylene diamines, ortho-aminophenols, and ortho-aminothiophenols, to give seven-membered heterocyclic compounds. The active hydrogen compound is of course, difunctional, that is, it must contain two active hydrogen atoms in order to undergo ring closure, thus in order to provide ring nitrogen atoms in the end product each nitrogen atom of the reactant must contain at least one active hydrogen. The second active hydrogen, may or may not be present on a nitrogen atom depending upon the particular reactant employed. Other substituents may be attached to the nitrogen atoms as long as there is at least one active hydrogen.

In practice, the heterocyclic compounds are prepared by contacting the acylated intermediate with the active hydrogen compound in an inert organic solvent at temperatures ranging from about 0° C. up to about the boiling point of the solvent. Although the order of addition of the reactants is not necessarily critical, it is preferred to add the active hydrogen compound to the acylated amide contained in the inert organic solvent. Thereafter, the reaction mixture is stirred at the aforementioned temperature until the reaction is complete. Depending upon the choice of amide intermediate and active hydrogen compound, the reaction is completed within a period ranging from a few minutes to several hours. Recovery of the resulting heterocyclic compound can be effected by known techniques such as crystallization and the like.

As previously indicated, the solvent employed should be inert to the reactants and easily separated from the desired product. Of course, the use of solvents which themselves contain active hydrogen atoms should be avoided. Illustrative inert, organic solvents which have been found to be suitable are the hydrocarbons, such as benzene, toluene, xylene; ethers such as diethyl ether, dipropyl ether, and the like chlorinated hydrocarbons, such as chlorobenzene, and the like.

In general it has been observed that the mole ratio of active hydrogen reactant to the amide intermediate should be at least about 2:1 and more preferably at least about 3:1.

In one embodiment of the present invention, substituted and unsubstituted hydrazines react with the acylated amide intermediate according to the aforementioned process to provide five-membered heterocyclic compounds (II):

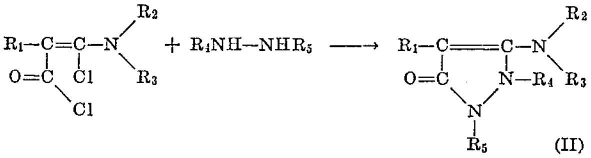

(II)

wherein $R_1$–$R_3$ are as previously described and $R_4$ and $R_5$ represent hydrogen or aliphatic, aromatic, or heterocyclic groups with the proviso that when $R_4$ is hydrogen, structure II is not stable and rearrangement occurs to give structure (III)

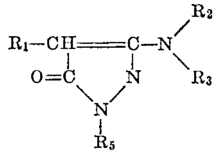

(III)

Preferred hydrazines which can be employed in the process of the invention include those wherein $R_4$ and $R_5$ contain up to 18 carbon atoms and represent hydrogen, alkyl, alkenyl, aryl, alkaryl, aralkyl and dialkylaminopropoxy groups.

Illustrative hydrazines which can be employed include, among others, hydrazine, methylhydrazine, N,N'-dimethylhydrazine, butylhydrazine, N,N'-methylbutylhydrazine, phenylhydrazine, aminoethoxyethylhydrazine and the like.

In a further embodiment of this invention substituted and unsubstituted hydroxylamines react with the acylated amide intermediate to provide novel five-membered heterocyclic compounds (IV)

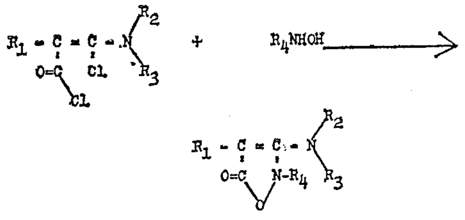

(IV)

wherein $R_1$–$R_4$ are as previously described, with the proviso that when $R_4$ is hydrogen the composition exists in the more stable form:

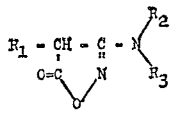

(V)

Illustrative hydroxylamines which can be employed in the preparation of the above mentioned compounds include, among others, hydroxylamine, methylhydroxylamine, propylhydroxylamine, butylhydroxylamine, octylhydroxylamine, phenylhydroxylamine, p-nitrophenylhydroxylamine, dimethylaminobutylhydroxylamine, and the like.

In another embodiment, the acylated amide intermediate can be reacted with amidines to provide six-membered heterocyclic compounds (VI)

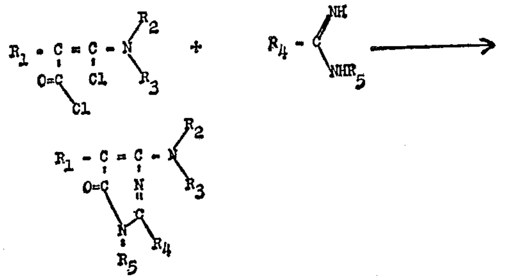

wherein $R_1$–$R_5$ have the same value as previously indicated, with the proviso that when $R_5$ is hydrogen the composition exists in the more stable form:

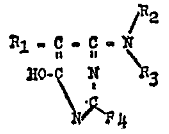

Illustrative amidines which can be employed in the preparation of the aminopyrimidinones of this embodiment include, among others, methylamidine, propylamidine, butylamidine, octylamidine, benzamidine, and the like.

A final embodiment of this invention is directed to the seven-membered ring aminobenzodiazepinones and the aminobenzothiazepinones which are prepared according to the instant process by the reaction of the acylated amide intermediate with ortho-diaminobenzenes, ortho-aminothiophenols, or ortho-aminophenols

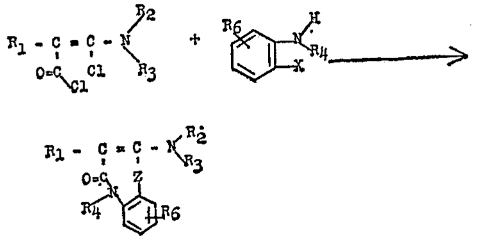

wherein $R_1$–$R_4$ have the same values as previously indicated, $R_6$ represents $R_4$ or halogen, X represents amino- ($-NH_2$), mono-substituted amino ($-NHR_5$) mercapto or hydroxyl, and Z represents $>NH$ or $>NR_5$), oxygen or sulfur, with the proviso that when Z represents $>NH$ the aminobenzodiazepinones have the more stable structure:

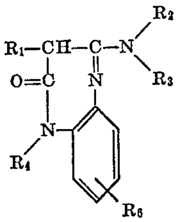

wherein the $R_1$–$R_4$ and $R_6$ have the same value as previously given.

Illustrative compounds which can react with the acylated amides according to this embodiment of the invention include, among others, the ortho-diaminobenzenes, such as ortho-diaminobenzene 3,4-diaminotoluene, 1-propyl-3,4-diaminobenzene, 1-chloro-3,4-diaminobenzene, and the like; the ortho-aminothiophenols, such as ortho-aminothiolbenzene, 3-amino-4-thioltoluene, and the like; the ortho-aminophenols, such as orthoaminophenol, 3-amino-4-hydroxytoluene and the like.

Due to their heterocyclic nature and the presence of an amine group attached directly to a ring carbon atom, the compositions prepared by the process of this invention are particularly useful in a wide variety of applications. For instance, due to their basic nature, the compounds produced by the process of this invention can be used as hydrogen halide acceptors in a variety of reactions. For example the compositions of this invention can be employed as hydrogen halide acceptors in the process for producing cyclopentadienyl metal compounds described in U.S. Pat. 3,071,605 which issued Jan. 1, 1963.

Moreover, the compositions of this invention which contain at least one hydrogen atom attached to a ring carbon, oxygen or nitrogen atom, particularly the aminopyrazolones, are useful in the photographic industry as color couplers.

Additionally, the aminopyrazolones, aminooxazolones and the aminopyrimidinones have been found to be useful as catalysts in the curing of polymeric systems, particularly epoxy resins. Epoxy resins, when cured, have found utility as protective surface coatings, for potting or encapsulating electrical components, and the like.

The following examples are illustrative:

EXAMPLES 1–26

In the following examples the acylated amide intermediate was prepared, as previously described, by reacting the amide with phosgene, and subsequently reacting the intermediate with active hydrogen compounds. Examples 1–5 (Table I) indicate the boiling points of several intermediate products obtained by the aforementioned process. Examples 6–18 (Tables II, III and IV) are directed to the preparation of aminopyrazolones which are formed from the acylated intermediate and hydrazines. Examples 19–23 (Tables V and VI) encompass the preparation of aminoisoxazolones from the intermediate and hydroxylamines. Examples 24 and 25 (Table VII) describe the preparation of aminopyrimidinones from the amide intermediate and amidines. Examples 26–28 (Table VIII) relate to the preparation of aminobenzodiazepinones from the amide intermediate and an ortho-diaminobenzene while Examples 29–31 (Tables IX and X) are directed to the preparation of aminobenzothiazepinones from the intermediate and ortho-aminothiophenol. Finally, Example 32 (Table XI) describes the preparation of aminobenzoxazepinones from the intermediate and ortho-aminophenol. When ortho-aminothiophenol or ortho-aminophenol are employed, these reactants are more acidic than the corresponding diamino compounds. As a result the initial products of Example 29 reacts with further ortho aminothiophenol to give the aminobenzothiazepinone of Example 30. A similar intermediate product is formed for the composition of Example 32. In the tables the column headed $R_2$, $R_3$ indicates the groups for both $R_2$ and $R_3$. For example, the entry $CH_3$ means that both $R_2$ and $R_3$ represent methyl groups while the entry $-(CH_2)_5$ indicates that $R_2$ and $R_3$ together form the piperidene group with the nitrogen atom.

TABLE I

Preparation of acylated intermediate

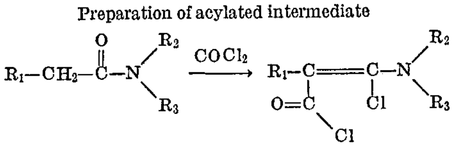

| Example | $R_1$ | $R_2$, $R_3$ | Boiling point of intermediate, ° C. (mm.) |
|---|---|---|---|
| 1 | $CH_3$ | $-(CH_2)_5-$ | 118 (0.5) |
| 2 | $(CH_3)_3$ | $CH_3$ | 60 (2) |
| 3 | $C_2H_5$ | $CH_3$ | 75 (0.5) |
| 4 | $C_2H_5$ | $C_2H_5$ | 77 (0.5) |
| 5 | $CH_3$ | $C_2H_5$ | 79 (0.5) |

TABLE II

Aminopyrazolones

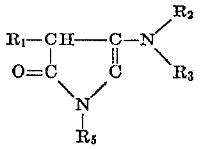

| Example | $R_1$ | $R_2R_3$ | $R_5$ | Melting or boiling point, ° C. (mm.) | Crystallization solvent | Formula | Calculated C | Calculated H | Calculated N | Found C | Found H | Found N |
|---|---|---|---|---|---|---|---|---|---|---|---|---|
| 6 | $CH_3$ |  | H | 178 | Ethyl acetate | $C_9H_{15}N_3O$ | 59.66 | 8.29 | 23.21 | 60.00 | 8.48 | 23.58 |
| 7 | $C_2H_5$ | $CH_3$ | $CH_3$ | 83 (0.4) | | $C_8H_{15}N_3O$ | 56.80 | 8.87 | 24.87 | 56.63 | 8.86 | 25.21 |
| 8 | $CH_3$ | 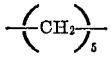 | $CH_3$ | 66 | Hexane | $C_{10}H_{17}N_3O$ | 61.52 | 8.72 | 21.55 | 60.75 | 8.89 | 21.61 |
| 9 | $CH_3$ | $C_2H_5$ | $CH_3$ | 93 (0.5) | | $C_9H_{17}N_3O$ | 59.01 | 9.29 | 22.95 | 58.55 | 9.52 | 23.25 |
| 10 | $C_2H_5$ | $C_2H_5$ | $CH_3$ | 97 (0.5) | | $C_{10}H_{19}N_3O$ | 60.90 | 9.65 | 21.32 | 60.38 | 9.90 | 21.75 |
| 11 | t-$C_4H_9$ | $CH_3$ | $CH_3$ | 67 | Petroleum ether | $C_{10}H_{19}N_3O$ | 60.90 | 9.65 | 21.32 | 60.94 | 9.72 | 21.34 |
| 12 | $C_2H_5$ | $C_2H_5$ | $C_6H_5$ | 142 (0.01) | | $C_{15}H_{21}N_3O$ | 69.50 | 8.11 | 16.21 | 69.14 | 8.32 | 16.78 |

TABLE III

Aminopyrazolones

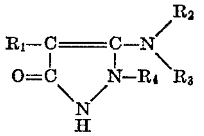

| Example | $R^1$ | $R_2R_3$ | $R_4$ | Melting or boiling point, ° C. | Crystallization solvent | Formula | Calculated C | Calculated H | Calculated N | Found C | Found H | Found N |
|---|---|---|---|---|---|---|---|---|---|---|---|---|
| 13 | $C_2H_5$ | $CH_3$ | $CH_3$ | 148 | Hexane | $C_8H_{15}N_3O$ | 56.80 | 8.87 | 24.87 | 56.48 | 8.96 | 25.11 |
| 14 | $C_2H_5$ | $C_2H_5$ | $CH_3$ | 161 | Petrol ether | $C_{10}H_{19}N_3O$ | 60.90 | 9.65 | 21.32 | 60.71 | 9.78 | 21.27 |
| 15 | $C_2H_5$ | $C_2H_5$ | $C_6H_5$ | 169 | Ethanol | $C_{15}H_{21}N_3O$ | 69.50 | 8.11 | 16.21 | 69.20 | 8.29 | 16.34 |
| 16 | $CH_3$ | 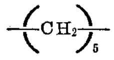 | $C_6H_5$ | 235 | do | $C_{15}H_{19}N_3O$ | 70.03 | 7.40 | 16.35 | 69.73 | 7.47 | 16.30 |

TABLE IV

Aminopyrazolones

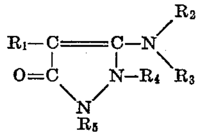

| Example | $R_1$ | $R_2R_3$ | $R_4R_5$ | Melting point, ° C. | Crystallization solvent | Formula | Calculated C | Calculated H | Calculated N | Calculated O | Found C | Found H | Found N | Found O |
|---|---|---|---|---|---|---|---|---|---|---|---|---|---|---|
| 17 | $CH_3$ | 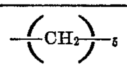 | $C_6H_5$ | 149 | Ethanol | $C_{21}H_{23}N_3O$ | 75.68 | 6.91 | 12.61 | 4.80 | 75.40 | 6.94 | 12.89 | 4.99 |
| 18 | Cl | $C_2H_5$ | $C_6H_5$ | 159 | Petrol ether | $C_{19}H_{20}ClN_3O$ | 66.78 | 5.86 | 12.30 | 4.68 | 66.91 | 5.92 | 12.19 | 4.80 |

TABLE V

Aminoisoxazolones

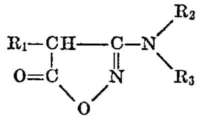

| Example | $R_1$ | $R_2$ | Melting or boiling point, ° C. (mm.) | Crystallization solvent | Formula | Calculated C | Calculated H | Calculated N | Found C | Found H | Found N |
|---|---|---|---|---|---|---|---|---|---|---|---|
| 19 | $C_2H_5$ | $C_2H_5$ | 108 (0.05) | | $C_9H_{16}N_2O_2$ | 58.70 | 8.69 | 15.21 | 58.13 | 8.80 | 15.42 |
| 20 | $CH_3$ | 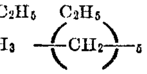 | 50 | Petrol ether | $C_9H_{14}N_2O_2$ | 59.35 | 7.69 | 15.38 | 58.62 | 7.70 | 15.52 |

TABLE VI

Aminoisoxazolones

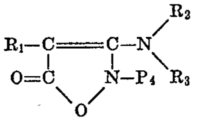

| Example | $R_1$ | $R_2R_3$ | $R_4$ | Melting or boiling point, °C. (mm.) | Crystallization solvent | Formula | Calculated C | Calculated H | Calculated N | Calculated O | Found C | Found H | Found N | Found O |
|---|---|---|---|---|---|---|---|---|---|---|---|---|---|---|
| 21 | $CH_3$ | 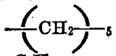 | $CH_3$ | 124 (0.005) | | $C_{10}H_{16}N_2O_2$ | 61.25 | 8.16 | 14.28 | | 60.25 | 8.21 | 14.59 | |
| 22 | $C_2H_5$ | $C_2H_5$ | $C_6H_5$ | 128 | Ethyl acetate hexane | $C_{15}H_{20}N_2O_2$ | 69.22 | 7.69 | 10.77 | 12.32 | 69.22 | 7.95 | 10.74 | 12.52 |
| 23 | $CH_3$ | 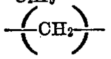 | $C_6H_5$ | 78 | Hexane | $C_{15}H_{18}N_2O_2$ | 69.75 | 6.98 | 10.87 | 12.40 | 69.89 | 7.26 | 10.88 | 12.31 |

TABLE VII

Aminopyrimidinones

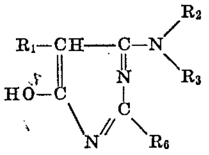

| Example | $R_1$ | $R_2R_3$ | $R_6$ | Melting or boiling point, °C. | Crystallization solvent | Formula | Calculated C | Calculated H | Calculated N | Calculated O | Found C | Found H | Found N | Found O |
|---|---|---|---|---|---|---|---|---|---|---|---|---|---|---|
| 24 | $CH_3$ | 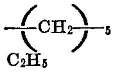 | $C_6H_5$ | 240 | Ethanol | $C_{16}H_{19}N_3O$ | 71.38 | 7.06 | 15.61 | 5.95 | 70.99 | 7.14 | 15.78 | 6.28 |
| 25 | $C_2H_5$ | $C_2H_5$ | $C_6H_5$ | 141 | Acetone | $C_{16}H_{21}N_3O$ | 70.82 | 7.75 | 15.51 | 5.92 | 70.62 | 7.98 | 15.72 | 6.12 |

TABLE VIII

Aminobenzodiazepinones

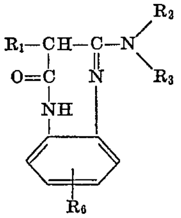

| Example | $R_1$ | $R_2R_3R_6$ | Melting or boiling point, °C. | Crystallization solvent | Formula | Calculated C | Calculated H | Calculated N | Calculated O | Calculated Cl | Found C | Found H | Found N | Found O | Found Cl |
|---|---|---|---|---|---|---|---|---|---|---|---|---|---|---|---|
| 26 | $CH_3$ | 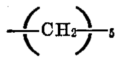 | 156 | Petrol ether | $C_{15}H_{19}N_3O$ | 70.03 | 7.39 | 16.35 | 6.23 | | 70.22 | 7.49 | 16.11 | 6.39 | |
| 27 | $C_2H_5$ | $C_2H_5$ | 157 | do | $C_{15}H_{21}N_3O$ | 69.50 | 8.11 | 16.21 | | | 69.55 | 8.36 | 16.63 | | |
| 28 | $C_2H_5$ | $C_2H_5Cl$ | 166 | Ethylacetate | $C_{15}H_{20}ClN_3O$ | 61.30 | 6.82 | 14.32 | | 12.11 | 61.49 | 6.88 | 14.05 | | 12.01 |

TABLE IX

Aminobenzotiazepinones

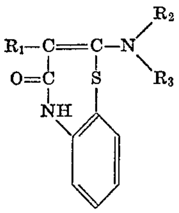

| Example | $R_1$ | $R_2R_3$ | Melting or boiling point, °C. | Crystallization solvent | Formula | Calculated C | Calculated H | Calculated N | Calculated S | Found C | Found H | Found N | Found S |
|---|---|---|---|---|---|---|---|---|---|---|---|---|---|
| 29 | $CH_3$ | 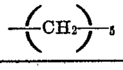 | 184 | Ethanol | $C_{15}H_{18}N_2OS$ | 65.70 | 6.57 | 10.22 | 11.67 | 65.88 | 6.68 | 10.31 | 11.56 |

TABLE X

Aminobenzothiazepinones

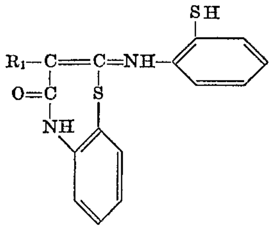

| Example | $R_1$ | Melting or boiling point, ° C. | Crystallization solvent | Formula | Calculated C | Calculated H | Calculated N | Calculated O | Calculated S | Found C | Found H | Found N | Found O | Found S |
|---|---|---|---|---|---|---|---|---|---|---|---|---|---|---|
| 30 | $CH_3$ | 122 | Acetone water | $C_{16}H_{14}N_2OS_2$ | 61.17 | 4.46 | 8.92 | 5.09 | 20.36 | 61.29 | 4.41 | 8.82 | 5.11 | 20.34 |
| 31 | $C_2H_5$ | 119 | Hexane | $C_{17}H_{16}N_2OS_2$ | 62.20 | 4.88 | 8.54 | | 19.50 | 61.88 | 4.83 | 4.84 | | 19.42 |

TABLE XI

Aminobenzoxapinones

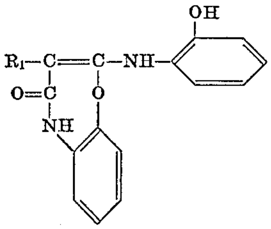

| Example | $R_1$ | Melting or boiling point, ° C. | Crystallization solvent | Formula | Calculated C | Calculated H | Calculated N | Calculated O | Found C | Found H | Found N | Found O |
|---|---|---|---|---|---|---|---|---|---|---|---|---|
| 32 | $CH_3$ | 152 | Acetone water | $C_{16}H_{14}N_2O_3$ | 68.10 | 4.97 | 9.93 | 17.00 | 68.24 | 5.03 | 9.74 | 17.36 |

Although the invention has been illustrated by the preceding examples, the invention is not to be construed as limited to the materials or conditions employed herein, but rather the invention encompasses the generic area as hereinbefore disclosed. Various modifications and embodiments of this invention can be made without departing from the spirit and scope thereof.

What is claimed is:

1. A process for the preparation of a compound of the formula:

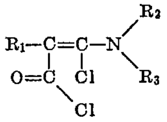

which comprises contacting an amide of the formula:

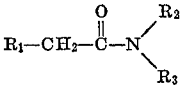

wherein $R_1$ represents a member selected from the group consisting of halogen and lower alkyl, $R_2$ and $R_3$ represent members selected from the group consisting of lower alkyl and halolower alkyl, with the proviso that $R_2$ and $R_3$ when taken together with the nitrogen atom to which they are attached can form 1-piperidyl with phosgene, in a mole ratio of phosgene to amide of at least about 1.5 to 1.

References Cited

UNITED STATES PATENTS 2,075,359 3/1937 Salzberg et al. ...... 424—250

OTHER REFERENCES

Buijle et al.: Tetrahedron, vol. 24: 4217–21, June 1968.

Eilingsfeld et al.: Angew Chem., vol. 72: 836–45 (1960).

Eilingsfeld et al.: Chem. Ber. vol. 96; 2671–80 (1963).

Bosshard et al.: Helv. Chim. Acta, vol. 42: 1659–71 (1959).

Fawcett et al.: Jacs, vol. 84: 4276 (1962).

HENRY R. JILES, Primary Examiner

S. D. WINTERS, Assistant Examiner

U.S. Cl. X.R.

260—544 Y, 544 L, 544 M, 326.3, 326.5 FN, 239.3 R, 558 R, 561 HL, 557 R, 293.72, 326.5 E, 561 R, 561 B, 295 K, 347.3, 297 Z, 310 A, 307 A, 256.4 C, 2 EP, 47 EP; 96—56,5